United States Patent
Zhang et al.

(10) Patent No.: US 11,768,126 B2
(45) Date of Patent: Sep. 26, 2023

(54) METHOD OF SHIP ICE RESISTANCE MODEL EXPERIMENT BASED ON NON-REFRIGERATED MODEL ICE

(71) Applicant: DALIAN UNIVERSITY OF TECHNOLOGY, Liaoning (CN)

(72) Inventors: Guiyong Zhang, Liaoning (CN); Yuyan Jiang, Liaoning (CN); Zhi Zong, Liaoning (CN); Zhe Sun, Liaoning (CN); Hao Wang, Beijing (CN); Biye Yang, Liaoning (CN); Zhihong Yin, Liaoning (CN); Ning Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 581 days.

(21) Appl. No.: 17/044,773

(22) PCT Filed: Aug. 9, 2019

(86) PCT No.: PCT/CN2019/099884
§ 371 (c)(1),
(2) Date: Oct. 1, 2020

(87) PCT Pub. No.: WO2020/140435
PCT Pub. Date: Jul. 9, 2020

(65) Prior Publication Data
US 2021/0108986 A1    Apr. 15, 2021

(30) Foreign Application Priority Data
Jan. 5, 2019    (CN) .................... 201910009613.4

(51) Int. Cl.
G01M 10/00    (2006.01)
B63B 71/20    (2020.01)
C09K 3/24    (2006.01)

(52) U.S. Cl.
CPC ............. *G01M 10/00* (2013.01); *B63B 71/20* (2020.01); *B63B 2211/06* (2013.01); *C09K 3/24* (2013.01)

(58) Field of Classification Search
CPC ........... G01M 10/00; B63B 71/20; C09K 3/24
See application file for complete search history.

(56) References Cited

FOREIGN PATENT DOCUMENTS

| CN | 106394806 A | * | 2/2017 |
|----|-------------|---|--------|
| CN | 106394806 A |   | 2/2017 |

(Continued)

*Primary Examiner* — Herbert K Roberts
(74) *Attorney, Agent, or Firm* — NKL Law; Allen Xue

(57) ABSTRACT

The present disclosure discloses a method of ship ice resistance model experiment based on non-refrigerated model ice, including the following steps: determining the overall length $L_1$, breadth B and scale ratio λ of a selected ship model; determining the size $A_1$ of an experimental area for placing broken ice in the ship ice resistance model experiment; determining the characteristic length of model ice; determining the quantitative proportion of the model ice for each size under the target coverage ratio c of the model; obtaining the number of the model ice for each size under the target coverage ratio according to the quantitative proportion of the model ice for each size under the target coverage ratio c and the total area $A_2$ of the model ice; determining the geometrical shape and parameters of each size under the target coverage ratio c of the model ice. The present disclosure solves the problems of poor economy and poor operability in a freezing model ice experiment of an ice basin, and provides a design method for carrying out a ship ice resistance model experiment in a towing tank.

3 Claims, 6 Drawing Sheets

(56) References Cited

FOREIGN PATENT DOCUMENTS

| | | | | | |
|---|---|---|---|---|---|
| CN | 107014587 | A | * | 8/2017 | ............ G01M 10/00 |
| CN | 107014587 | A | | 8/2017 | |
| CN | 107065597 | A | * | 8/2017 | ............. G05B 17/02 |
| CN | 108195561 | A | * | 6/2018 | ............. B63B 71/00 |
| CN | 108750002 | A | * | 11/2018 | ............. B63B 71/20 |
| CN | 109506889 | A | | 3/2019 | |
| JP | 2007333303 | A | * | 12/2007 | |
| KR | 20140049177 | A | * | 4/2014 | |
| KR | 20150041421 | A | * | 4/2015 | |
| KR | 20150134648 | A | | 12/2015 | |
| KR | 101913517 | B1 | * | 10/2018 | |
| RU | 2384828 | C1 | * | 3/2010 | |

\* cited by examiner

METHOD OF SHIP ICE RESISTANCE MODEL EXPERIMENT BASED ON NON-REFRIGERATED MODEL ICE

TECHNICAL FIELD

The present disclosure relates to a parameter design method of ship ice resistance model experiment, in which the non-refrigerated model ice is used to simulate broken ice without bending failure, belonging to the field of ship engineering.

BACKGROUND ART

Much attention has been paid to the development of the Arctic region, and the broken ice field is the most common ice condition. However, there are few researches on the subject of ship navigation in broken ice field, which is mainly due to the lack of basic measured data or experimental data of ship resistance in the broken ice field. Therefore, it is necessary and important to carry out ship ice resistance experiment.

Model experiment is one of the research means to establish the relationship between various physical factors, including ship model experiment method. The ship model experiment method includes refrigerated model ice experiment in ice basin and non-refrigerated model ice experiment of conventional towing tank. Although the refrigerated model ice experiment can more truly simulate the ship navigating state in the broken ice, the time period of ice field preparation is long, and it is necessary to adjust repeatedly to prepare an ice field meeting the strength requirements, and the prepared ice field can only be used in one set of experiments. As a result, it takes a lot of manpower and material resources to conduct a ship ice resistance model experiment, and the resulting ice floe are not easy to manipulate. In non-refrigerated model ice experiment, the arrangement of the ice field is relatively convenient and time-saving, considering that the bending failure of broken ice is not the main component of resistance in ship navigation, the non-deformation material can be used as non-refrigerated model ice, so that the model ice can be used repeatedly to save the material cost. Therefore, the research and develop of a method for ship ice resistance model experiment based on non-refrigerated model ice is necessary.

SUMMARY OF THE INVENTION

According to the technical problems such as the scarcity of ice basin, the technique difficulty, long period and high cost of the preparation of ice field, the present disclosure provides a method of ship ice resistance model experiment based on non-refrigerated model ice. The non-refrigerated model ice experiment has obvious advantages in satisfying the experimental conditions. The present disclosure simulates the non-refrigerated model ice without bending failure by using H-type PP material, and provides a set of parameter design method of non-refrigerated ice ship model experiment. Under the assumption of no bending failure, the present disclosure calculates the size and the shape distribution of the model according to the actually observed statistical law; in addition provides a simple and practical method to build a small basin with a fence, which can more accurately simulate the real state of the broken ice field. Based on the above reasons, the present disclosure can be popularized and applied to the ship ice resistance model experiment of non-refrigerated ice in the ship engineering field.

A method of ship ice resistance model experiment based on non-refrigerated model ice, including the following steps:

S1. Determining the overall length $L_1$, breadth B, and scale ratio $\lambda$ of a selected ship model A size $A_1$ of an experimental area for placing broken ice in the ship ice resistance model experiment is determined. If the pool is full of broken ice, the total number of model ice required is too large, resulting in unnecessary waste. Therefore, according to the purpose of saving and accurate measurement, an experiment is carried out in a smaller area circled in the centre of the pool. In the direction of width, the boundary has a certain influence on the experiment, it is generally believed that when the width of the experimental area W is greater than 3 times the breadth of the ship model, the boundary influence can be neglected; in the direction of length, in order to simulate the ergodic steady sailing process of the ship in the broken ice field, it is necessary to ensure that the length $L_2$ of the experimental area is at least 5 times that of the overall length of the ship model.

According to the overall length $L_1$ and the breadth B of the selected ship model, determining the minimum size of the experimental area, further determining the size of the experimental area:

$$L_2 \geq 5L_1,$$

$$W \geq 3B,$$

$$A_1 = WL_2,$$

wherein, $L_2$ represents a length of the experimental area, and the W represents a width of the experimental area;

The location of the experimental area in the pool: in the direction of width, the spacing between the left/right edge of the experimental area and the lateral wall of the pool should be the same; in the direction of length, when the bow enters the experimental area, it is necessary to ensure that the ship has been sailing at a constant speed for a period of time, that is, the flow around the ship model has been stable; the trailer should stop when the bow is close to but not reach the terminus of the experimental area, the terminus of the experimental area should be a certain distance from the basin wall to ensure that the boundary influence is within the acceptable range.

S2. Determining a characteristic length of model ice

S21. Determining a target coverage ratio c of the model ice

S22. According to the experimental area size $A_1$ obtained in step S1 and the target ice coverage ratio c obtained in step S21, determining a total area $A_2$ of the model ice:

$$A_2 = cA_1.$$

The present disclosure has an assumption that the broken ice have no bending failure, which requires the length and thickness of the actual model ice satisfy a certain conditions, so as to ensure that the breaking and bending of the broken ice are secondary in the experimental process (which can be neglected), and the broken ice moves like a rigid body.

S23. According to the bending theory of thin plate sitting on elastic foundation, determining a critical characteristic length $L_c$ of the broken ice without bending failure:

$$L_c = \sqrt[4]{\frac{D}{k}},$$

wherein, D represents a flexural rigidity of ice, satisfying the following equation:

$$D = \frac{Et^3}{12(1-v^2)},$$

E represents an elastic modulus of ice, with the unit of Pa; and t represents an actual thickness of the broken ice, with the unit of m; $v$ is Poisson's ratio; and k represents an elastic stiffness of the base, satisfying the following equation:

$$k = \rho_w g,$$

$\rho_w$ is the density of water, with the unit of kg/m$^3$; and g is the acceleration of gravity, with the unit of kg/m$^2$.

S24. Determining the critical characteristic length l of the model ice:

$$l = \frac{L}{\lambda};$$

wherein, L represents a characteristic length of the broken ice, satisfying the following condition:

$$L \leq L_c.$$

As long as the characteristic length L of the broken ice is less than the critical characteristic length $L_c$ of the broken ice, it is considered to satisfy the assumption of no bending failure of the broken ice.

S25. According to the critical characteristic length l of the model ice, determining a characteristic length $l_n$ of each size of the model ice in the ship ice resistance model experiment.

S3. Determining a quantitative proportion of the model ice for each size under the target coverage ratio c of the model ice:

$$N(l_n) = \begin{cases} \beta_1 l_n^{-\alpha_1}, & l_n \in [1, 40] \\ \beta_2 l_n^{-\alpha_2}, & l_n \in [40, 1500] \end{cases},$$

wherein, $N(l_n)$ represents a number of the model ice with the size $l_n$, $\alpha_1$, $\alpha_2$, $\beta_1$ and $\beta_2$ are coefficients, $\alpha_1 = 1.15$, $\alpha = 1.87$; when the characteristic length $l_n$ of the model ice is in a range of $[l_1, l_2]$, the total area of the model ice satisfies the following equation:

$$A = \int_{l_1}^{l_2} n_a(x)s(x)dx = \frac{-\pi\beta\alpha}{4(\alpha-2)} \cdot \left(l_2^{(-\alpha+2)} - l_1^{(-\alpha+2)}\right)$$

Solving the following equation set to obtain $\beta_1$ and $\beta_2$:

$$\begin{cases} cA = \int_1^{1500} n_a(x)s(x)dx, & A = 1 \text{ km}^2 \\ \beta_1 l^{-\alpha_1} = \beta_2 l^{-\alpha_2}, & l = 40 \text{ m} \end{cases};$$

S4. According to the quantitative proportion of the model ice of each size under the target coverage ratio c obtained in step S3, and the total area $A_2$ of the model ice to obtain the number of the model ice for each size under the target coverage ratio c.

S5. Determining a geometrical shape and parameters of the model ice for each size under the target coverage ratio c:

A roundness R of the model ice satisfies the following equation:

$$R = \frac{d_p}{d} = \frac{\frac{P}{\pi}}{l_n} = \frac{P}{\pi l_n};$$

wherein, $d_p$ represents a perimeter-equivalent diameter, d represents a area-equivalent diameter, and d is equal to $l_n$, P represents a perimeter of geometrical shape of the model ice.

From the above equation, it can be seen that the larger R is, the more square the model ice shape is, when $d_p = l_n$, the shape of the model ice is a circle with R=1.

An area S of the geometrical shape of the model ice satisfies the following equation:

$$S = \frac{\pi l_n^2}{4};$$

A caliper diameter is a distance between a pair of external parallel lines of a shape, which can be vividly understood as the distance of the shape measured by a caliper. If the pair of the parallel lines rotates a circle around the shape, there will be a maximum distance and a minimum distance, which are respectively defined as the maximum caliper diameter $D_{max}$ and the minimum caliper diameter $D_{min}$.

A caliper diameter ratio $R_a$ of the model ice satisfies the following equation:

$$R_a = D_{max}/D_{min}.$$

P is determined according to the value of R.

The geometrical shape of the model ice is determined according to P, S, and $R_a$.

The actual construction method of the experimental area is to build a fence with PVC pipes connected by tee pipes; in order to make the PVC pipes float on the water surface to perform a good effect for blocking the model ice, the outer wall of the PVC pipe located under the water is pasted with pearl cotton board.

The Model ice is made of H-type PP material, which is stable in mechanical properties, strong enough and insoluble in water. Therefore, it is an ideal non-refrigerated model ice material.

Non-refrigerated model ice is made of H-type PP material, the full name of the material is Homopolymer polypropylene, which is polymerized by propylene monomer; the molecular chain of the H-type PP material has a very high regularity, so that the material has good mechanical properties, good strength and high crystallinity, and its disadvantage is poor shock resistance. The main material properties of H-type PP material and sea ice are shown in the table below:

| H-type PP material (PP-H) | |
| --- | --- |
| Property | Value |
| Density (g/cm³) | 0.904-0.908 |
| Elastic Modulus (MPa) | 1300 |
| Poisson's Ratio | 0.42 |
| Hardness | 80-110 |
| Water Absorption (in 24 hours) | <0.01% |
| Friction coefficient between PP-H and steel | |
| Static Friction Coefficient | 0.30 |
| Dynamic friction coefficient | 0.28 |
| Friction coefficient between PP-H materials | |
| Static Friction Coefficient | 0.76 |
| Dynamic friction coefficient | 0.44 |
| Sea ice | |
| Property | Value |
| Density (g/cm³) | 0.90-0.92 |
| Elastic Modulus (MPa) | 5000 |
| Poisson's Ratio | 0.74 |
| Friction coefficient between sea ice and steel | |
| Static Friction Coefficient | 0.25 |
| Dynamic Friction Coefficient | 0.05-0.1 |
| Friction coefficient between sea ice | |
| Static Friction Coefficient | 0.51-0.86 |
| Dynamic Friction Coefficient | 0.41-0.44 |

Comparing the properties in the above table, it can be seen that the density and friction coefficient of H-type PP material are very close to those of sea ice, which can more accurately reproduces the motion state of sea ice during the ship movement, so as to estimate the ship ice resistance in broken ice field. Moreover, PP-H material has stable mechanical properties, sufficient strength, insoluble in water, highly maneuverable during experimental, and can be used repeatedly, so as to save the experimental cost.

The present disclosure overcomes the problems of poor economy and poor operability of the freezing model ice experiment of ice basin, and provides a method for carrying out a ship ice resistance model experiment in the towing tank.

BRIEF DESCRIPTION OF THE DRAWINGS

In order to more clearly illustrate the embodiments of the present disclosure or the technical solutions in the prior art, the drawings required in the description of the embodiments or the prior art will be briefly introduced below. Obviously, the drawings in the following descriptions are some embodiments of the present disclosure. For those of ordinary skilled in the art, other drawings can be obtained based on these drawings without inventive effort.

DETAILED DESCRIPTION OF THE PREFERRED EMBODIMENTS

Figure 1:
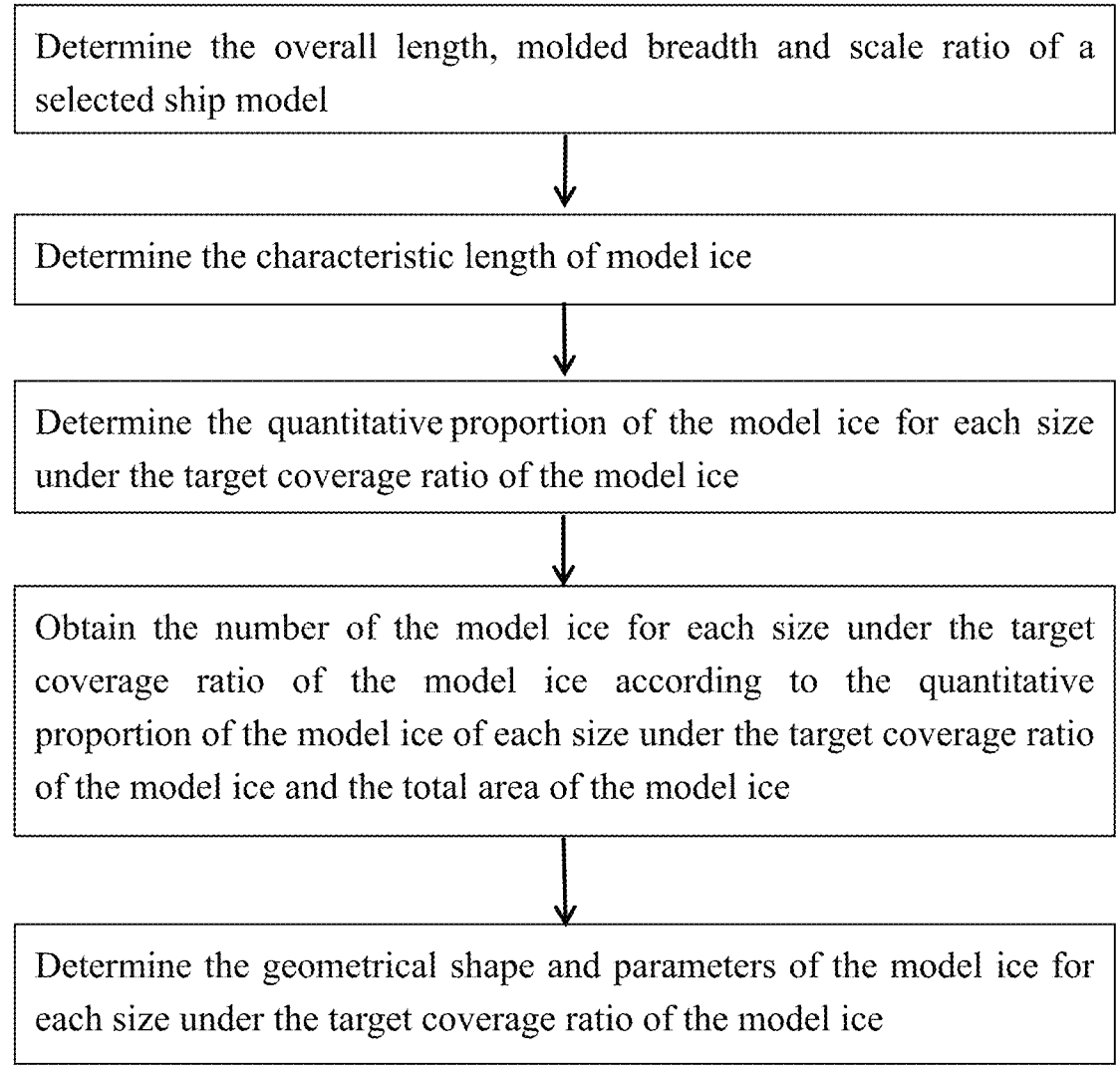
FIG. 1 is a flow diagram of the design method of ship ice resistance model experiment based on non-refrigerated model ice in the embodiment of the present disclosure.
Figure 2:
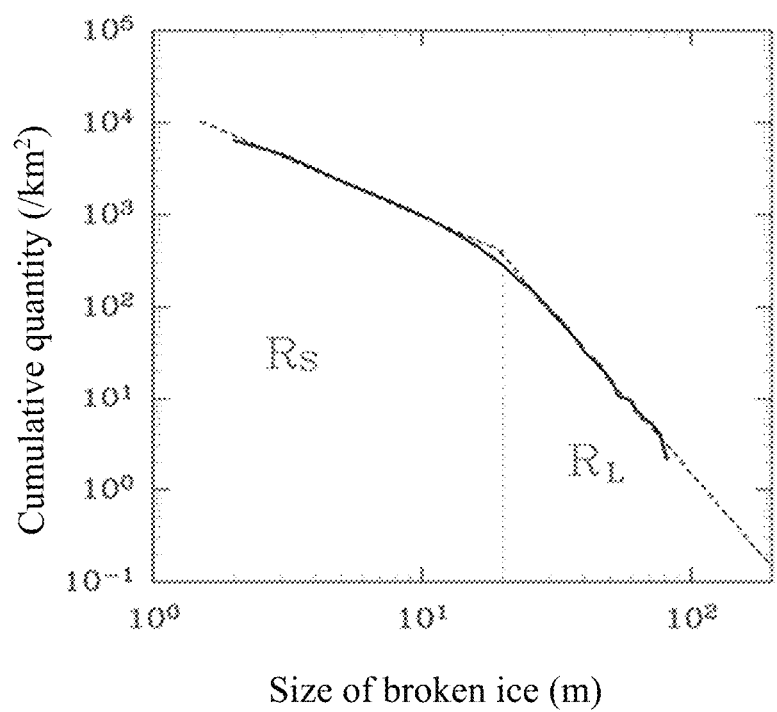
FIG. 2 is a function curve of the size distribution law of broken ice.

To make the objectives, technical solutions and advantages of the present disclosure clearer, a clear and complete description in the embodiments of the present disclosure may be given herein after in combination with the accompany drawings in the embodiment of the present disclosure. Obviously, the described embodiments are parts of the embodiments of the present disclosure, but not all of them. Based on the embodiments in the present disclosure, all other embodiments obtained by those of ordinary skilled in the art without inventive effort are within the scope of the present disclosure.

As shown in FIG. 1 to FIG. 7, a design method of ship ice resistance model experiment based on non-refrigerated model ice, includes the following steps:

S1. The overall length $L_1$, breadth B and scale ratio λ of the selected ship model were determined.

A FPSO ship model was used in this embodiment, with a scale ratio λ=50 and the main size of the ship model is shown in the table below.

| | |
| --- | --- |
| Overall Length (m) | 4.36 |
| Length between Perpendiculars (m) | 4.2 |
| Breadth (m) | 0.656 |
| Depth (m) | 0.364 |
| Draft (m) | 0.16 |

$L_1$=4.36 m, B=0.656 m.

The size $A_1$ of the experimental area for placing broken ice in the ship ice resistance model experiment was determined:

According to the overall length $L_1$ and the breadth B of the selected ship model, the minimum size of the experimental area was determined, and the size of the experimental area was further determined:

$$L_2 \geq 5L_1 = 21.8m,$$

$$W \geq 3B = 1.968m,$$

$$A_1 = WL_2,$$

wherein, $L_2$ represents the length of the experimental area, and W represents the breadth of the experimental area.

According to the minimum size of the experimental area and the actual size of the towing tank (170 m×7.0 m×4.0 m), the size of the experimental area of 29 m×3.0 m×4.0 m was finally selected.

S2. The characteristic length of the model ice was determined

S21. The target coverage ratio c was determined

The ratio c was set to 90%, 80%, and 60% respectively.

S22. According to the experimental area size $A_1$ obtained in step S1 and the target ice coverage ratio c obtained in step S21, a total area $A_2$ of the model ice was determined:

$$A_2 = cA_1,$$

When c was equal to 90%, 80%, and 60%, the corresponding $A_2$ was 67.5 m², 60 m² and 45 m².

S23. According to the bending theory of thin plate sitting on elastic foundation, the critical characteristic length $L_c$ of the broken ice without bending failure was determined:

$$L_c = \sqrt[4]{\frac{D}{k}},$$

wherein, D represents a flexural rigidity of the ice, which satisfies the following equation:

$$D = \frac{Et^3}{12(1-v^2)},$$

E represents an elastic modulus of the ice, E=5 GPa; and t represents an actual thickness of the broken ice, t=1 m; $v$ represents Poisson's ratio, $v$=0.3; k represents an elastic stiffness of the base, which satisfies the following equation:

$$k = \rho_w g,$$

$\rho_w$ is the density of water, $\rho_w$=1025 kg/m³; and g is the acceleration of gravity, g=9.81 kg/m².

S24. The critical characteristic length l was determined:

$$l = \frac{L}{\lambda};$$

wherein, L represents the characteristic length of the broken ice, which satisfies the following equation:

$$L \leq L_c.$$

So, $$l = \frac{L}{\lambda} \leq \frac{L_c}{\lambda} = 0.3 \text{m}$$

S25. According to the critical characteristic length l of the model ice, the characteristic length $l_n$ of each size of the model ice in the ship ice resistance model experiment was determined to be 10 cm, 15 cm, 20 cm, 25 cm, and 30 cm respectively.

S3. the quantitative proportion of the model ice for each size under the target coverage ratio c of the model ice was determined:

$$N(l_n) = \begin{cases} \beta_1 l_n^{-\alpha_1}, & l_n \in [1, 40] \\ \beta_2 l_n^{-\alpha_2}, & l_n \in [40, 1500] \end{cases},$$

wherein, this equation is the size distribution law function of the broken ice.

Wherein, $N(l_n)$ represents a number of the model ice with the size $l_n$, $\alpha_1$, $\alpha_2$, $\beta_1$ and $\rho_2$ are coefficients, $\alpha_1$=1.15, $\alpha_2$=1.87, when the characteristic length l of the model ice is in the range of $[l_1, l_2]$, the total area of the model ice satisfies the following equation:

$$A = \int_{l_1}^{l_2} n_a(x)s(x)dx = \frac{-\pi\beta\alpha}{4(\alpha-2)} \cdot (l_2^{(-\alpha+2)} - l_1^{(-\alpha+2)})$$

The following equation set was solved to find $\beta_1$ and $\beta_2$.

$$\begin{cases} cA = \frac{-\pi\beta_1\alpha_1}{4(\alpha_1-2)} \cdot (40^{(-\alpha_1+2)} - 1^{(-\alpha_2+2)}) + \frac{-\pi\beta_2\alpha_2}{4(\alpha_2-2)} \cdot (1500^{(-\alpha_1+2)} - 40^{(-\alpha_2+2)}), & A = 1\text{km}^2 \\ \beta_1 l^{-\alpha_1} = \beta_2 l^{-\alpha_2}, & l = 40\text{m} \end{cases}$$

The ratio c was equal to 90%, 80% and 60%, and the corresponding $\beta_3$ and $\beta_2$ values were respectively solved, as shown in the table below:

| Target Coverage | 0.9 | 0.8 | 0.6 |
|---|---|---|---|
| $\beta_1$ | 1.776261 | 1.578899 | 1.184174 |
| $\beta_2$ | 0.17498 | 0.155538 | 0.11665378 |

$\beta_1$ and $\beta_2$ were plugged into the size distribution law function of the broken ice to obtain a cumulative distribution function of the corresponding target coverage. According to the obtained cumulative distribution function and the scale ratio $\lambda$, the quantitative proportion of the model ice with different sizes under the target coverage c of the model ice was calculated (In order to get a quantity of 30 cm by interpolation, calculating the cumulative quantity of 35 cm).

|  | 35 cm | 30 cm | 25 cm | 20 cm | 15 cm | 10 cm |
|---|---|---|---|---|---|---|
| Full Dimension (km) | 0.0175 | 0.015 | 0.0125 | 0.01 | 0.0075 | 0.005 |
| 0.9 Accumulation | 186 | 222 | 274 | 354 | 493 | 786 |
| Current |  | 36 | 52 | 80 | 139 | 293 |

-continued

|  | 35 cm | 30 cm | 25 cm | 20 cm | 15 cm | 10 cm |
|---|---|---|---|---|---|---|
| 0.8 Accumulation | 166 | 198 | 244 | 315 | 439 | 699 |
| Current |  | 32 | 46 | 71 | 124 | 261 |
| 0.6 Accumulation | 124 | 148 | 183 | 236 | 329 | 524 |
| Current |  | 24 | 35 | 53 | 93 | 195 |

S4. According to the quantitative proportion of the model ice of each size under the target coverage ratio c obtained in step S3, and the total area $A_2$ of the model ice, the number of the model ice of each size under the target coverage ratio c was obtained, as shown in the table below:

| Target Coverage | 30 cm | 25 cm | 20 cm | 15 cm | 10 cm |
|---|---|---|---|---|---|
| 0.9 | 197 | 283 | 437 | 758 | 1598 |
| 0.8 | 175 | 251 | 389 | 674 | 1421 |
| 0.6 | 131 | 189 | 292 | 505 | 1066 |

Figure 3:
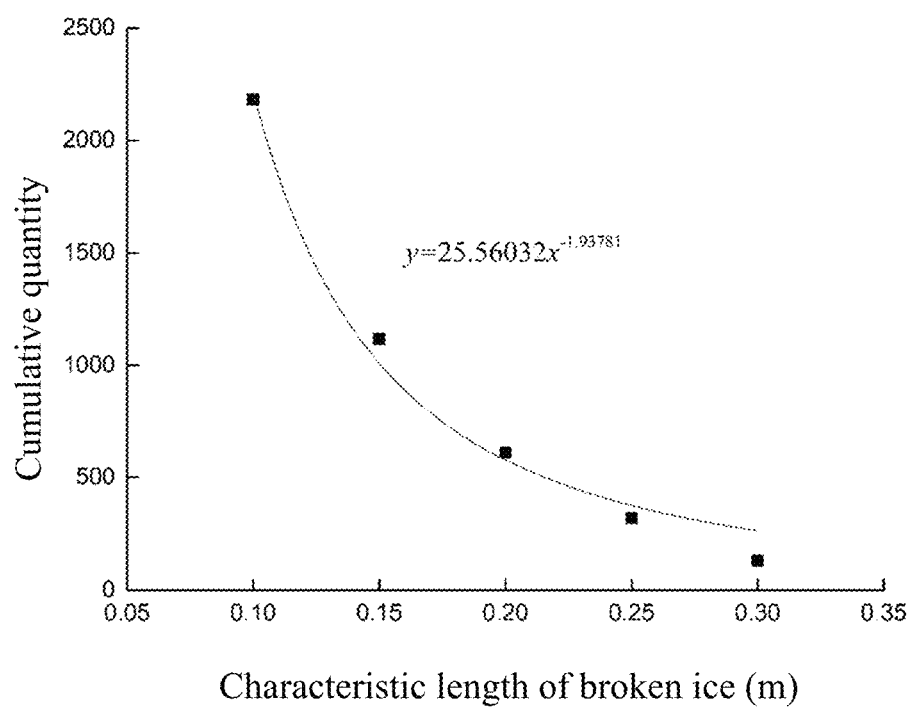
FIG. 3 is a distribution diagram of cumulative quantity of the model ice for each size under the target coverage ratio c of the model ice in the embodiments of the present disclosure (c=0.6).

The cumulative quantity distribution with target coverage ratio of 0.6 is shown in FIG. 3.

S5. The geometrical shape and parameters of the model ice for each size under target coverage ratio c were determined:

The roundness R of the model ice satisfies the following formula:

$$R = \frac{d_p}{d} = \frac{\frac{P}{\pi}}{l_n} = \frac{P}{\pi l_n};$$

wherein, $d_p$ represents a perimeter-equivalent diameter, d represents a area-equivalent diameter, and d is equal to $l_n$, P represents a perimeter of geometrical shape of the model ice.

An area S of the geometrical shape of the model ice satisfies the following equation:

$$S = \frac{\pi l_n^2}{4};$$

A caliper diameter ratio $R_a$ of the model ice satisfies the following equation:

$$R_a = D_{max}/D_{min}$$

The statistic data showed that the R of the broken ice behaves as a linear function, which was about 1.145±0.002, meanwhile, the smaller the characteristic length L of the ice floe was, the smaller the fluctuation was. The caliper diameter ratio $R_a$ was about 1.78±0.4, and the smaller the maximum caliper diameter $D_{max}$, the smaller the fluctuation of $R_a$ was. Thus, took R=1.145, $R_a$=1.78.

P was determined according to the value of R;

|  | 30 cm | 25 cm | 20 cm | 15 cm | 10 cm |
|---|---|---|---|---|---|
| P (cm) | 107.91 | 89.93 | 71.94 | 53.96 | 35.97 |
| S (m2) | 0.070686 | 0.0491 | 0.0314 | 0.0177 | 0.00785 |
| $D_{min}$ (cm) | 19.93 | 16.6 | 13.28 | 9.96 | 6.64 |
| $D_{max}$ (cm) | 35.47 | 29.56 | 23.65 | 17.74 | 11.8 |

The geometrical shape of the model ice was determined according to P, S, and $R_a$.

Figure 4:
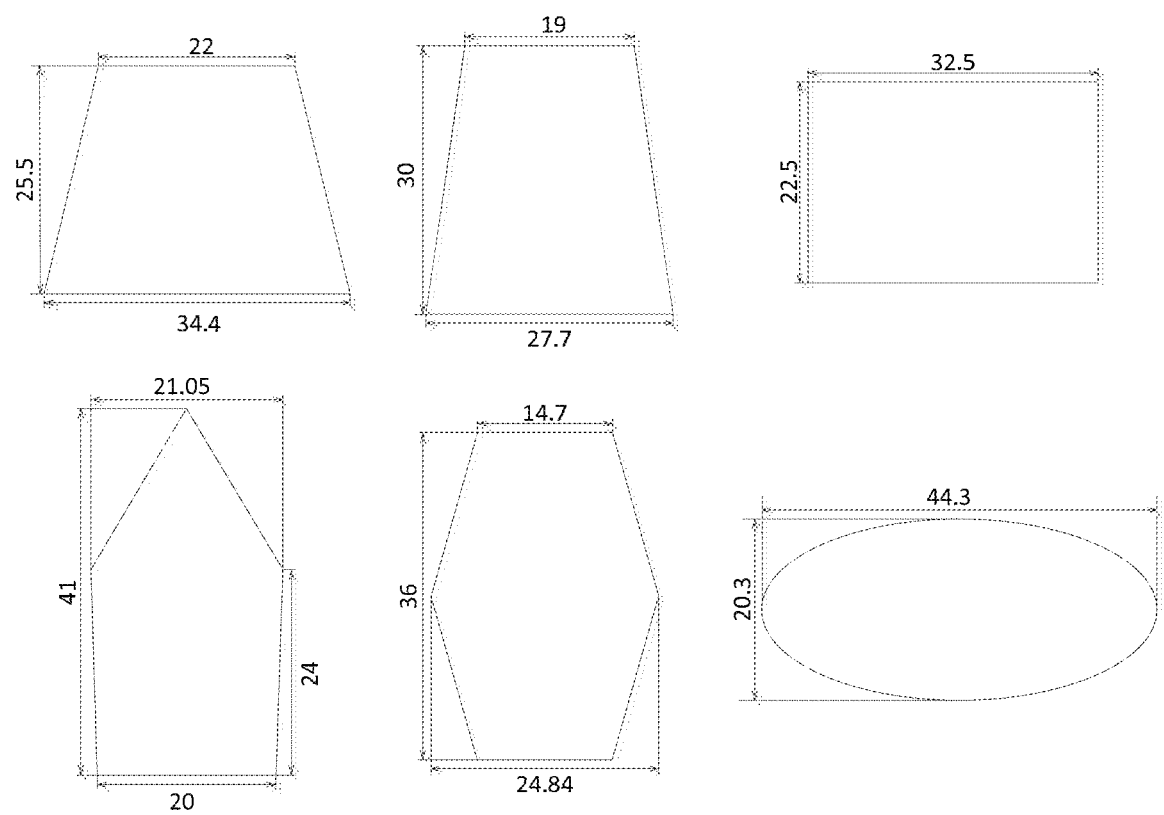
FIG. 4 is a schematic diagram of the geometric shape (30 cm) of the model ice in the embodiment of the present disclosure.

The geometric shape of the model ice was selected as polygon to satisfy the relationship of perimeter, area and side length of the shape in the table above, so as to determine the detailed geometric shape parameters of the regular polygon. Each polygon calculation method is different, and there are non-unique geometric parameters according to the above conditions, so there is no detailed calculation here. Only a set of diagrams of long trapezoid, flat trapezoid, rectangle, pentagon, hexagon, and ellipses (30 cm) with assumption of symmetry are listed here, as shown in FIG. 4.

Figure 5:
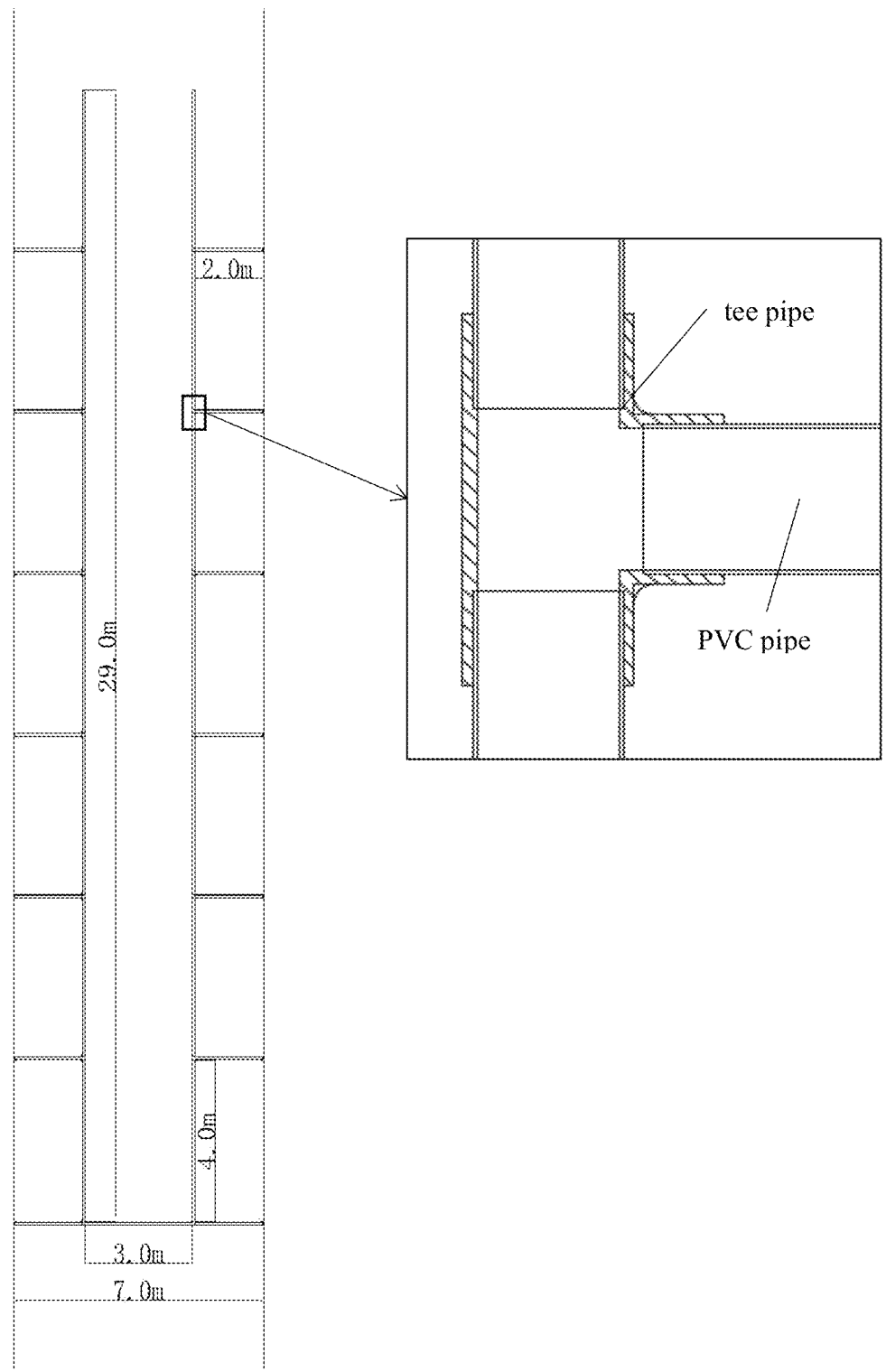
FIG. 5 shows the installation effect of the fence in the embodiment of the present disclosure.
Figure 6:
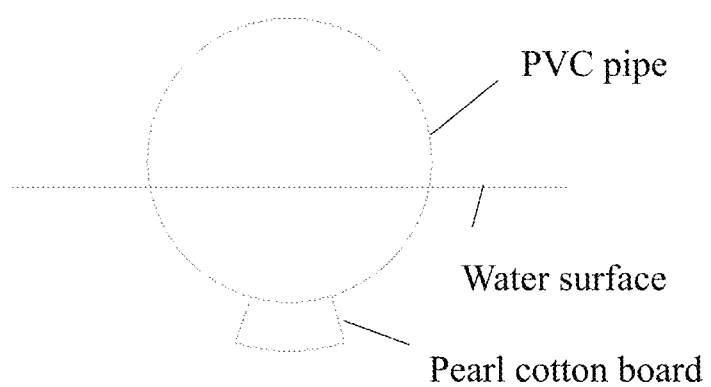
FIG. 6 is an assembly diagram of PVC pipe and pearl cotton board in the embodiment of the present disclosure.

After the experimental area was selected, a fence with a size of 29 m×3.0 m should be installed in the towing tank to fence the broken ice field for ship navigation. The fence was made of standard PVC pipe with a length of 4 m and a external diameter of 75 mm. The PVC pipes were connected with tee pipes. In order to strengthen the connection between the pipe fittings and the tee pipes, two holes were drilled in the overlap part of PVC pipe and the tee pipe, and the iron wire was tightened through the two holes. The whole installation effect of the fence is shown in FIG. 5. In addition, due to the PVC pipe is hollow structure, in order to make the PVC pipe floating on the water surface and achieve good ice blocking effect, a little modification should be made to PVC pipe. Different from the method of inserting would weight into the pipe and then blocking the two ends of the pipe fitting, a pearl cotton board with 2 cm×2 cm was pasted on the outer wall of the PVC pipe located under the water along its length direction, and the side of the pearl cotton board was installed right below the water surface. The installation diagram is shown in FIG. 6. The pearl cotton board with smaller density provides buoyancy, so as to avoid the problem of the model ice sliding out due to the PVC pipe sinks below the water surface, which can not only make the complete set of fence device has the expected ice blocking effect, but also save the cost and reduce the construction quantity.

Figure 7:
FIG. 7 is a picture of an experimental area in the embodiment of the present disclosure.

Finally, according to the above calculation results, the picture of the experimental area with a target coverage ratio of 0.6 is shown in FIG. 7.

At last, it should be stated that the above embodiments are only used to illustrate the technical solutions of the present disclosure without limitation; and despite reference to the aforementioned embodiments to make a detailed description of the present disclosure, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A method of ship ice resistance model experiment based on non-refrigerated model ice, comprising the following steps:

S1. determining an overall length $L_1$, a breadth B, and a scale ratio $\lambda$ of a selected ship model;

determining a size $A_1$ of an experimental area for placing broken ice in the ship ice resistance model experiment: according to the overall length $L_1$ and the breadth B of the selected ship model, determining the minimum size of the experimental area, further determining the size of the experimental area:

$L_2 \geq 5L_1$, $W \geq 3B$, $A_1 = WL_2$, wherein, $L_2$ represents a length of the experimental area, and W represents a width of the experimental area;

S2. determining a characteristic length of model ice:

S21. determining a target coverage ratio c of the model ice;

S22. according to the experimental area size $A_1$ obtained in step S1 and the target ice coverage ratio c obtained in step S21, determining a total area $A_2$ of the model ice:

$A_2 = cA_1$;

S23. according to the bending theory of thin plate sitting on elastic foundation, determining a critical characteristic length $L_c$ of the broken ice without bending failure:

$$L_c = \sqrt[4]{\frac{D}{k}},$$

wherein, D represents a flexural rigidity of ice, satisfying the following equation:

$$D = \frac{Et^3}{12(1-v^2)},$$

E represents an elastic modulus of ice, with the unit of Pa; t represents an actual thickness of the broken ice, with the unit of m; v is Poisson's ratio; and k represents an elastic stiffness of the base, satisfying the following equation:

$k = \rho_w g$, $\rho_w$ is the density of water, with the unit of kg/m$^3$; and g is the acceleration of gravity, with the unit of kg/m$^2$;

S24. determining the critical characteristic length l:

$$l = \frac{L}{\lambda},$$

wherein, L represents a characteristic length of the broken ice, satisfying the following condition:

$L \leq L_c$;

S25. according to the critical characteristic length l of the model ice, determining a characteristic length $l_n$ of each size of the model ice in the ship ice resistance model experiment;

S3. determining a quantitative proportion of the model ice for each size under the target coverage ratio c of the model ice:

$$N(l_n) = \begin{cases} \beta_1 l_n^{-\alpha_1}, & l_n \in [1, 40] \\ \beta_2 l_n^{-\alpha_2}, & l_n \in [40, 1500] \end{cases}$$

wherein, $N(l_n)$ represents a number of the model ice with the size $l_n$, $\alpha_1$, $\alpha_2$, $\beta_1$ and $\beta_2$ are coefficients, $\alpha_1 = 1.15$, $\alpha_2 = 1.87$; when the characteristic length $l_n$ of the model ice is in a range of $[l_1, l_2]$, the total area of the model ice satisfies the following equation:

$$A = \int_{l_1}^{l_2} n_a(x) s(x) dx = \frac{-\pi \beta \alpha}{4(\alpha - 2)} \cdot (l_2^{(-\alpha+2)} - l_1^{(-\alpha+2)}),$$

solving the following set of equations to obtain $\beta_1$ and $\beta_2$, $$\begin{cases} cA = \int_1^{1500} n_a(x) s(x) dx, & A = 1 \text{km}^2 \\ \beta_1 l^{-\alpha_1} = \beta_2 l^{-\alpha_2}, & l = 40 \text{m} \end{cases};$$

S4. according to the quantitative proportion of the model ice of each size under the target coverage ratio c obtained in step S3, and the total area $A_2$ of the model ice to obtain the number of the model ice of each size under the target coverage ratio c; and S5. determining a geometrical shape and parameters of the model ice for each size under the target coverage ratio c:

a roundness R of the model ice satisfies the following equation:

$$R = \frac{d_p}{d} = \frac{\frac{P}{\pi}}{l_n} = \frac{P}{\pi l_n};$$

wherein, $d_p$ represents a perimeter-equivalent diameter, d represents a area-equivalent diameter, and d is equal to $l_n$, P represents a perimeter of geometrical shape of the model ice;

an area S of the geometrical shape of the model ice satisfies the following equation:

$$S = \frac{\pi l_n^2}{4};$$

a caliper diameter ratio $R_a$ of the model ice satisfies the following equation:

$R_a = D_{max}/D_{min}$;

determining P according to the value of R;

determining the geometrical shape of the model ice according to P, S, and $R_a$.

2. The method according to claim 1, wherein an actual construction method of the experimental area is to build a fence with PVC pipes connected by tee pipes, and an outer wall of the PVC pipe located under the water is pasted with pearl cotton board.

3. The method according to claim 1, wherein the model ice is made of H-type PP material.

\* \* \* \* \*